US009760901B2

(12) United States Patent
Luk et al.

(10) Patent No.: US 9,760,901 B2
(45) Date of Patent: Sep. 12, 2017

(54) SYSTEMS AND METHODS TO PREDICT BIDDING BEHAVIOUR

(71) Applicant: eBay Inc., San Jose, CA (US)

(72) Inventors: Alpha Kamchiu Luk, San Jose, CA (US); Michael Ching, San Jose, CA (US); Ben Chisell, Battersea (GB); Johannes Braun, New York, NY (US); Tom Pugh, Chiswick (GB); Tom Wagstaff, Mortlake (GB); Shervin Moghaddam, Los Gatos, CA (US); Yu Liu, Mountain View, CA (US); Vinayak Agarwal, Santa Clara, CA (US); Gajanan Adalinge, Santa Clara, CA (US); David Goldberg, Palo Alto, CA (US)

(73) Assignee: eBay Inc., San Jose, CA (US)

( * ) Notice: Subject to any disclaimer, the term of this patent is extended or adjusted under 35 U.S.C. 154(b) by 279 days.

(21) Appl. No.: 14/202,365

(22) Filed: Mar. 10, 2014

(65) Prior Publication Data

US 2015/0254688 A1    Sep. 10, 2015

(51) Int. Cl.
*G06Q 30/00* (2012.01)
*G06Q 30/02* (2012.01)
*G06Q 30/08* (2012.01)
*G06Q 40/04* (2012.01)

(52) U.S. Cl.
CPC ......... *G06Q 30/0202* (2013.01); *G06Q 30/08* (2013.01); *G06Q 40/04* (2013.01)

(58) Field of Classification Search
CPC .............................. G06Q 30/08; G06Q 40/04
USPC ......................................................... 705/26.3
See application file for complete search history.

(56) References Cited

U.S. PATENT DOCUMENTS

| | | | | |
|---|---|---|---|---|
| 2001/0056396 | A1* | 12/2001 | Goino | G06Q 30/0601 705/37 |
| 2004/0128320 | A1* | 7/2004 | Grove | G06Q 30/08 |
| 2006/0149655 | A1* | 7/2006 | Leahy | G06Q 40/02 705/37 |
| 2008/0052219 | A1* | 2/2008 | Sandholm | G06Q 30/08 705/37 |
| 2009/0187485 | A1* | 7/2009 | Loui | G06Q 30/0225 705/14.26 |
| 2010/0318436 | A1* | 12/2010 | Jain | G06F 17/30985 705/26.61 |

* cited by examiner

*Primary Examiner* — Sujay Koneru
(74) *Attorney, Agent, or Firm* — Schwegman Lundberg & Woessner, P.A.

(57) ABSTRACT

Systems and methods to predict bidding behavior are described. The system identifies a listing that includes listing information that describes an item that is being auctioned on a network-based marketplace. The system further identifies bid classification information based on the number of bids received for the item. Finally, the system predicts whether no more bids are expected to be received for the item based on the classification information.

13 Claims, 12 Drawing Sheets

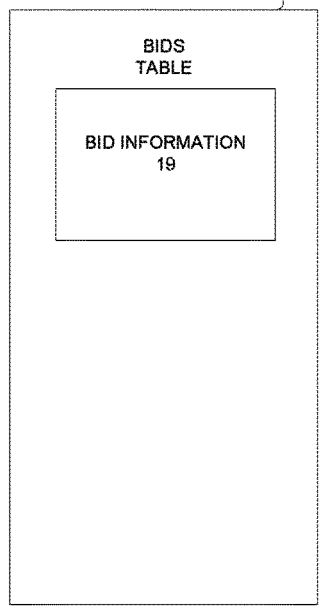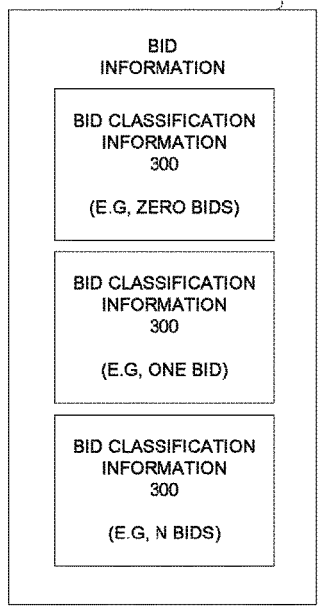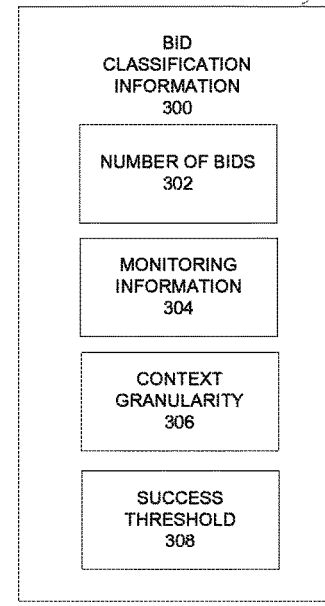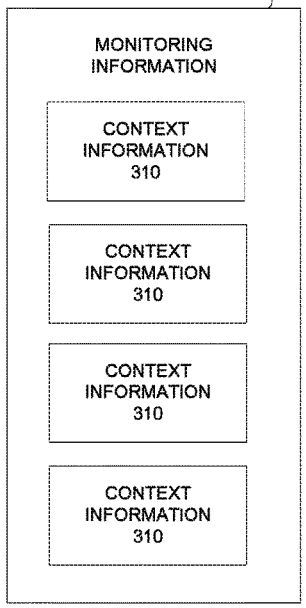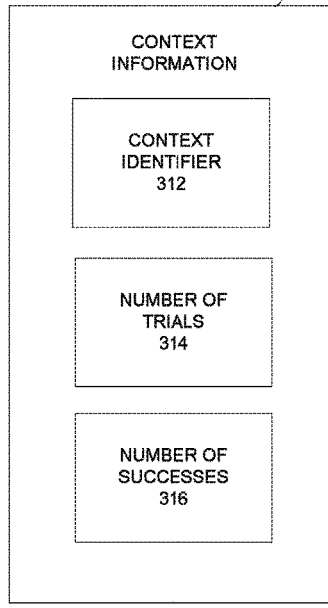

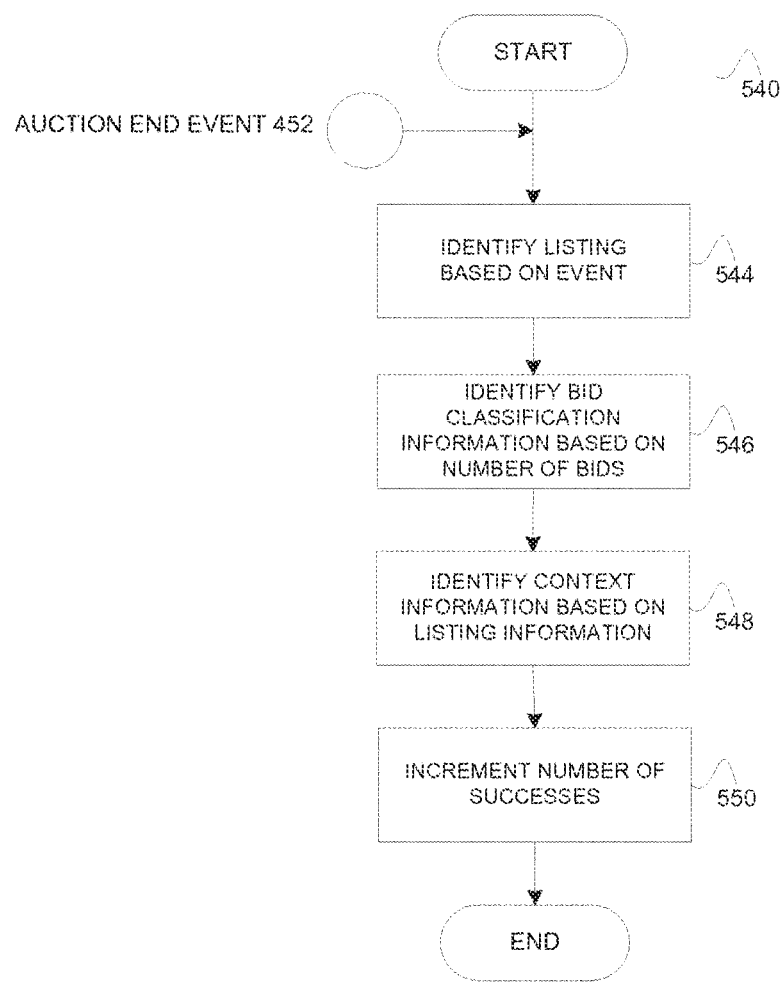

SYSTEMS AND METHODS TO PREDICT BIDDING BEHAVIOUR

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc. 2014. All Rights Reserved.

TECHNICAL FIELD

This disclosure relates to the technical field of data processing, and more particularly, to systems and methods to predict bidding behavior.

RELATED ART

A network-based marketplace may include listings that describe items or services that are being offered for sale in auctions. Some of the listings may not be expected to receive another bid but nevertheless be displayed on multiple user interfaces with other listings that are expected to receive another bid.

BRIEF DESCRIPTION OF THE DRAWINGS

Embodiments are illustrated, by way of example and not limitation, in the figures of the accompanying drawings, in which:

FIG. 4B is a block diagram illustrating a bids table, according to an embodiment;

FIG. 4C is a block diagram illustrating bid information, according to an embodiment;

FIG. 4D is a block diagram illustrating bid classification information, according to an embodiment;

FIG. 4E is a block diagram illustrating monitoring information, according to an embodiment;

FIG. 4F is a block diagram illustrating context information, according to an embodiment;

FIG. 7B is a flow diagram illustrating a method, according to an embodiment, to increment a number of successes;

DETAILED DESCRIPTION

In the following description, for purposes of explanation, numerous specific details are set forth in order to provide a thorough understanding of some example embodiments. It will be evident, however, to one of ordinary skill in the art that embodiments of the present disclosure may be practiced without these specific details.

Figure 1:
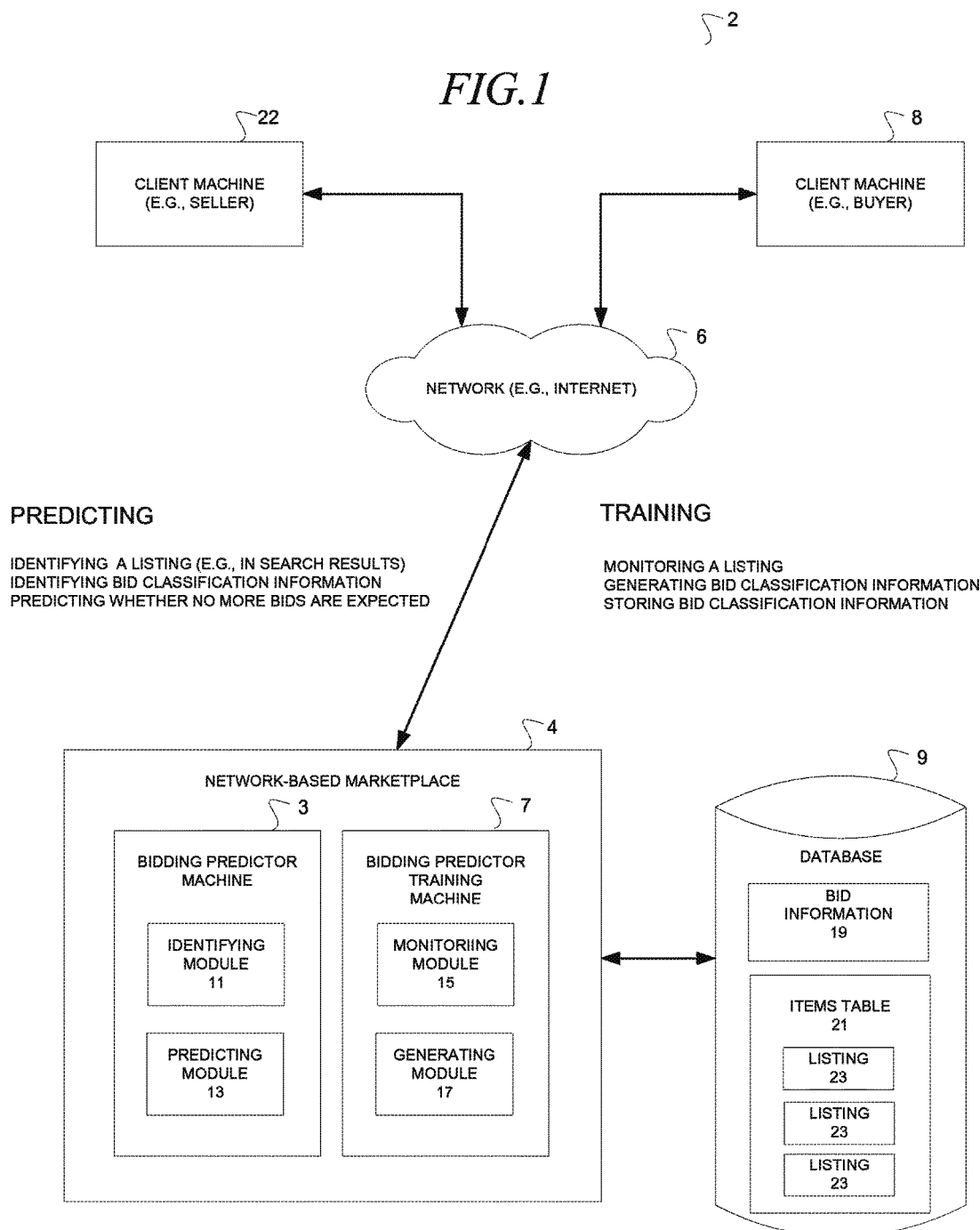
FIG. 1 illustrates a system to predict bidding behaviour, according to an embodiment.

FIG. 1 illustrates a system 2, according to an embodiment, to predict bidding behaviour. Broadly, the system 2 may include a client machine 8, operated by a buyer, and a client machine 22, operated by a seller, that communicate with a network-based marketplace 4 over a network 6 (e.g., the Internet) to auction or transact products and/or services. To this end, the buyer may enter a bid in an auction that is described by a listing that is managed by the network-based marketplace 4, which, in turn, processes the bid to update the auction to identify a winner. The network-based marketplace 4 may include a bidding predictor machine 3 that is invoked for a listing describing an auction to predict whether or not another bid is expected to be received in the auction. For example, according to one embodiment, the bidding predictor machine 3 may be invoked for an auction of an item for which zero bids have previously been received, and the bidding predictor machine 3 may return TRUE to indicate that no more bids are expected to be received in the auction, or FALSE to indicate that bids are expected to be received in the auction. Predicting whether no more bids may be received in an auction may be advantageous for several reasons. First, for example, listings that describe items or services that are currently being auctioned and are further associated with no bids may be removed from search results in response to the bidding predictor machine 3 identifying that no more bids are expected to be received for the auction. In another embodiment, the bidding predictor machine 3 may demote or move such a listing to the end of the search results. Accordingly, the bidding predictor machine 3 may increase revenues for the network-based marketplace 4 by avoiding the consumption of "screen real estate" with listings not likely to receive another bid. As a second example, a listing that is associated with a "fake auction" may be identified and removed from search results. Such a listing is authored by a seller with a start price that is near the market price of the item. The intention of the seller is to receive a single bid that wins that auction at the start price as not many buyers will bid an item over its market price. In contrast, a listing that is associated with a "normal auction" is authored by a seller that sets a start price that is rather low compared to the market price with the intention of letting the bidders' compete for the item. As before, the bidding predictor machine 3 may identify that no more bids are expected to be received for a listing associated with an auction for an item that has received a single bid and facilitate the removal of the listing from the search results. Generally, the network-based marketplace 4 may utilize the bidding predictor machine 3 to remove listings that describe items or services that are not expected to receive another bid from the search results.

The bidding predictor machine 3 may effectively be a bidding predictor machine for "N" bids (e.g., zero bid predictor machine, one bid predictor machine, two bid predictor machine, etc.) in accordance with the number of bids that were previously received in an auction for an item or service as described by the listing.

A bidding predictor training machine 7 may monitor an auction for bids and store the outcome of the monitoring in a database 9 as bid information 19. The bid information 19 may be organized according to the number of bids that were previously received in the auction. For example, the bid information 19 may be organized according to domains of zero bids, one bid, two bids, etc.

The network-based marketplace 4 may be coupled to the database 9 including an items table 21 that stores listings 23 including listing information that describes an item or service that is being auctioned. The listing information may be discretely divided into elements that are utilized as inputs to the bidding predictor training machine 7. For example, the elements of the listing information may include discrete elements in the form of shipping cost, seller rating, highest bid, etc. that are utilized as inputs to the bidding predictor machine 3 to identify contexts in which bidding behaviour is monitored/observed. A context may characterize a listing according to "N" dimensions, where a dimension is a discrete unit of listing information (e.g., price, time remaining in auction, etc.).

The bidding predictor training machine 7 may include a monitoring module 15 and a generating module 17. The monitoring module 15 may be used to monitor an auction and the generating module 17 may be used to generate/update the bid information 19 (e.g., bid classification information) according to a context that is identified based on the elements (e.g., shipping cost, seller rating, highest bid, etc.) of the listing information in a listing 23. The bidding predictor training machine 7 may utilize different types of machine learning to train the bidding predictor machine 3. Accordingly, the bidding predictor training machine 7 may not be limited solely to the machine learning described herein; but rather, may utilize other types of machine learning, including neural network learning, Bayesian learning, decision tree code, etc.

The bidding predictor machine 3 may include an identifying module 11 and a predicting module 13. The identifying module 11 may be utilized to identify the bid information 19 (e.g., bid classification information) in accordance with the number of bids that were previously received in an auction. Further, the identifying module 11 may be utilized to identify context information based on listing information in a listing 23 for which bidding behaviour is being predicted. As mentioned above, the listing information may be discretely divided into elements. The bidding predictor machine 3 may utilize the discrete elements of the listing information as inputs to identify a context and predict bidding behaviour for the present listing based on the previous training for the context. For example, the elements of the listing information may include discrete elements in the form of shipping cost, seller rating, highest bid, etc. that are utilized as inputs to the bidding predictor machine 3 to identify contexts in which bidding behaviour is predicted.

Figure 2:
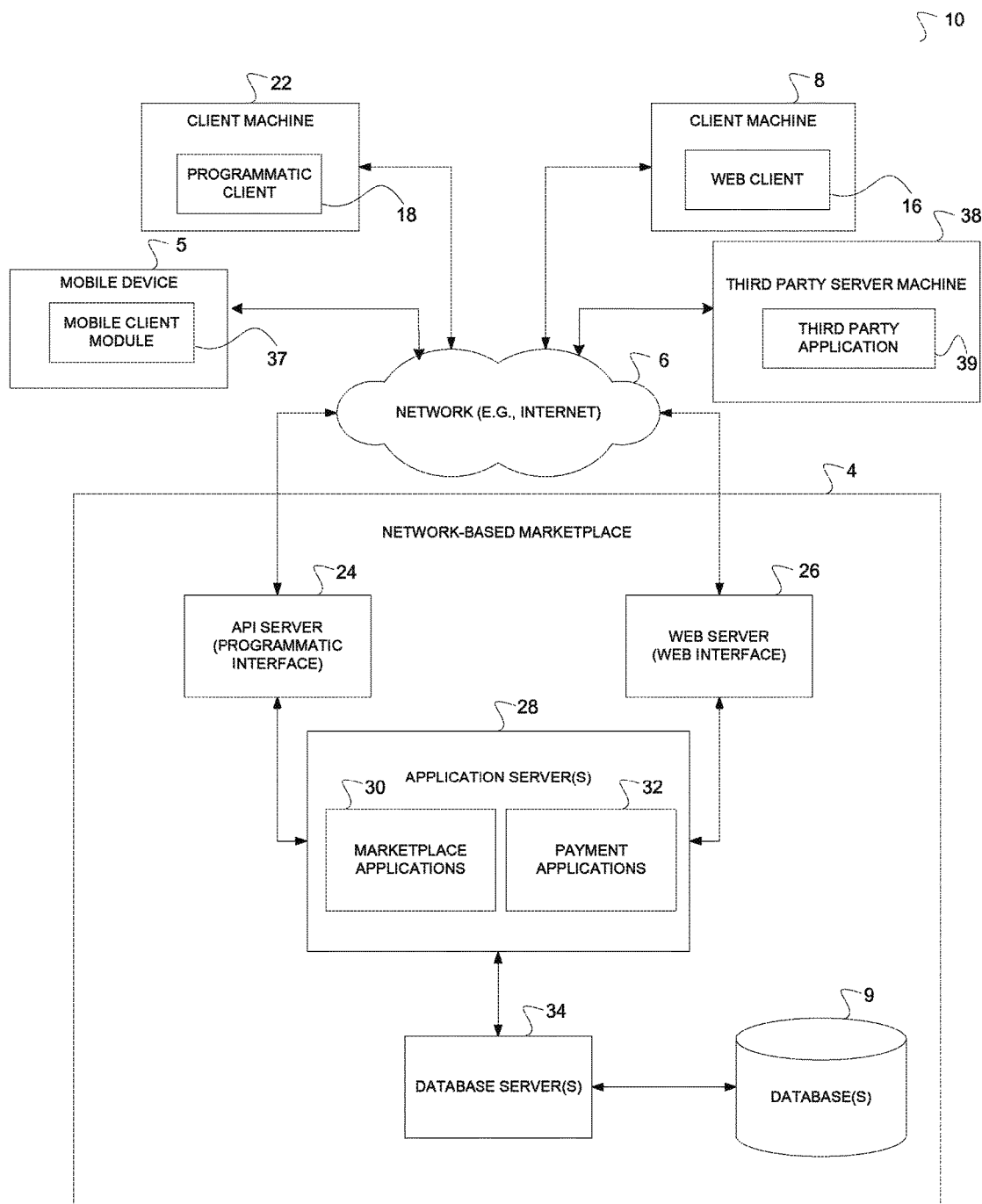
FIG. 2 further illustrates a system to predict bidding behaviour, according to an embodiment.

FIG. 2 further illustrates a networked system 10, according to an embodiment, to predict bidding behaviour. The networked system 10 corresponds to the system 2 in FIG. 1 and, accordingly, the same or similar references have been used to indicate the same or similar features unless otherwise indicated. The network-based marketplace 4 provides server-side functionality, via the network 6 (e.g., the Internet or Wide Area Network (WAN)) to one or more clients. FIG. 2 illustrates, for example, a web client 16 (e.g., a browser, such as the Internet Explorer browser developed by Microsoft Corporation of Redmond, Washington State) executing on the client machine 8, a programmatic client 18 executing on a client machine 22, and a mobile client module 37 executing on a mobile device 5. For example, the mobile client module 37 may be embodied as one or more mobile modules that are used to support a Blackberry™ wireless hand-held business or smart phone manufactured by Research In Motion of Waterloo, Ontario.

An Application Program Interface (API) server 24 and a web server 26 are coupled to, and provide programmatic and web interfaces respectively to, one or more application servers 28. The application servers 28 host one or more marketplace applications 30 and payment applications 32. The application servers 28 are, in turn, shown to be coupled to one or more database servers 34 that facilitate access to one or more databases 9.

The marketplace applications 30 may provide a number of marketplace functions and services to users that access the network-based marketplace 4. The payment applications 32 may likewise provide a number of payment services and functions to users. The payment applications 32 may allow users to accumulate value in accounts and then to later redeem the accumulated value for products (e.g., goods or services) that are made available via the marketplace applications 30. The value may be accumulated in a commercial currency, such as the U.S. dollar, or a proprietary currency, such as "points." While the marketplace applications 30 and payment applications 32 are shown in FIG. 2 to both form part of the network-based marketplace 4, it will be appreciated that, in alternative embodiments, the payment applications 32 may form part of a payment service that is separate and distinct from the network-based marketplace 4.

Further, while the networked system 10 shown in FIG. 2 employs client-server architecture, embodiments of the present disclosure are of course not limited to such an architecture and could equally well find application in a distributed, or peer-to-peer, architecture system, for example. The various marketplace applications 30 and payment applications 32 could also be implemented as stand-alone software programs, which do not necessarily have networking capabilities.

The web client 16 and the mobile client module 37 access the various marketplace applications 30 and payment applications 32 via the web interface supported by the web server 26. Similarly, the programmatic client 18 accesses the various services and functions provided by the marketplace applications 30 and payment applications 32 via the programmatic interface provided by the API server 24. The programmatic client 18 may, for example, be a seller application (e.g., the TurboLister application developed by eBay Inc., of San Jose, Calif.) to enable sellers to author and manage listings on the network-based marketplace 4 in an off-line manner, and to perform batch-mode communications between the programmatic client 18 and the network-based marketplace 4.

FIG. 2 also illustrates a third party application 39, executing on a third party server machine 38, as having programmatic access to the networked system 10 via the programmatic interface provided by the API server 24. The mobile device 5 may be embodied as a mobile phone, a personal digital assistant (PDA), a cell phone, or any other wireless device. For example, the mobile device 5 may be embodied as an iPhone mobile phone manufactured by Apple, Inc. of Cupertino, Calif., or, as previously mentioned, a Blackberry™ mobile phone manufactured by Research In Motion of Waterloo, Ontario.

Marketplace and Payment Applications

Figure 3:
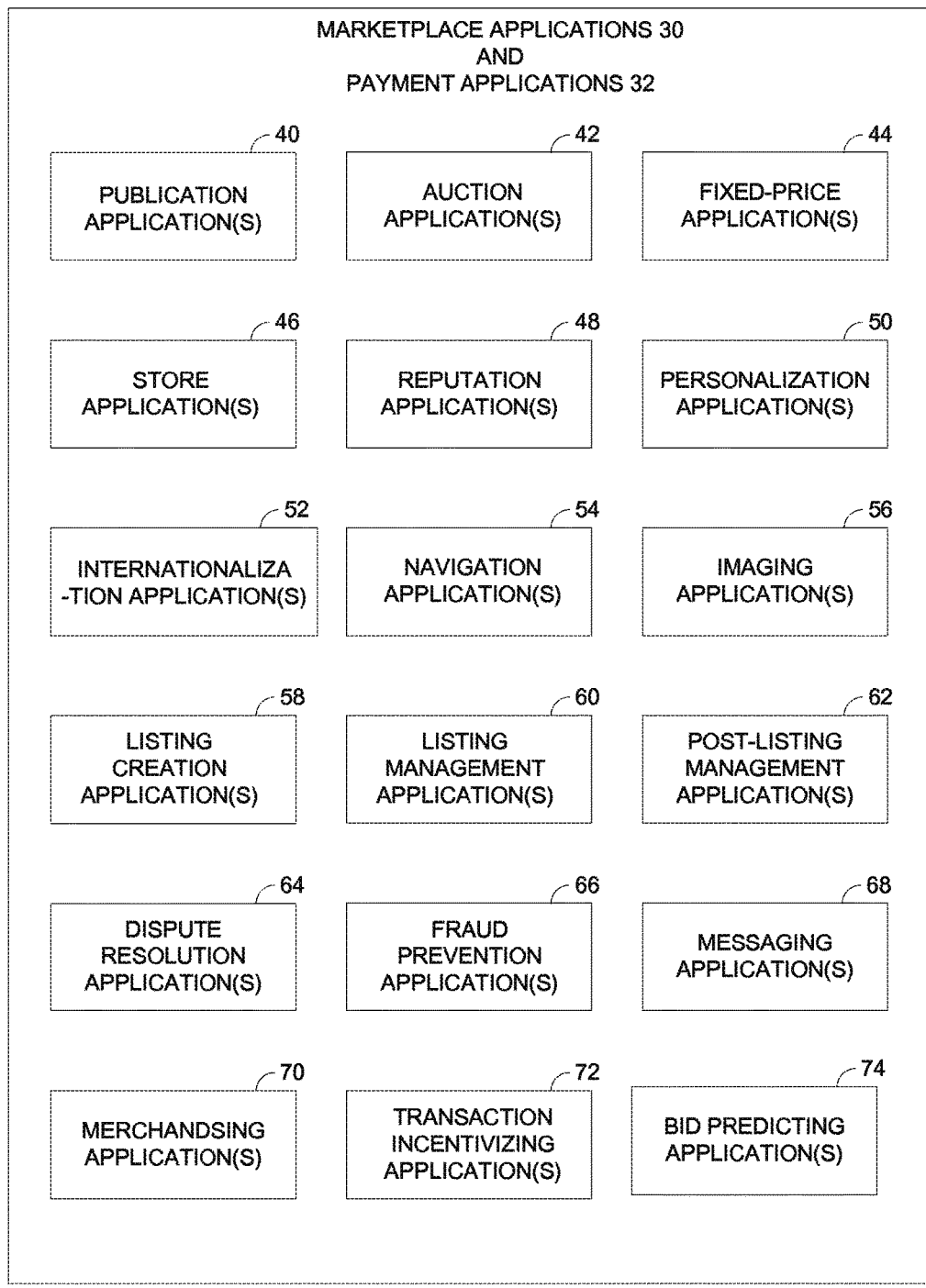
FIG. 3 is a block diagram illustrating marketplace applications and payment applications, according to an embodiment.

FIG. 3 is a block diagram illustrating marketplace applications 30 and payment applications 32 that, in one example embodiment, are provided as part of the networked system 10 of FIG. 2. The marketplace applications 30 and payment applications 32 may be hosted on dedicated or shared server machines, as shown on FIG. 2, that are communicatively coupled to enable communications between the server machines. The applications 30 and 32 themselves are communicatively coupled (e.g., via appropriate interfaces) to each other and to various data sources, so as to allow information to be passed between the applications 30 and 32 or so as to allow the applications 30 and 32 to share and access common data. The applications 30 and 32 may furthermore access one or more databases 9 via the database servers 34, as shown on FIG. 2.

The network-based marketplace 4 of FIG. 2 may provide a number of publishing, listing and price-setting mechanisms whereby a seller may list (or publish information concerning) goods or services for sale; a buyer may indicate a desire to purchase such goods or services; and a price can be set for a transaction pertaining to the goods or services. To this end, the marketplace and payment applications 30 and 32 are shown to include at least one publication application 40 and one or more auction applications 42 which support auction-format listing and price setting mechanisms (e.g., English, Dutch, Vickrey, Chinese, Double, Reverse auctions, etc.). The various auction applications 42 may also provide a number of features in support of such auction-format listings, such as a reserve price feature, whereby a seller may specify a reserve price in connection with a listing, and a proxy-bidding feature, whereby a bidder may invoke automated proxy bidding.

A number of fixed-price applications 44 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings and may allow a buyer to purchase goods or services, which are also being offered for sale via an auction, for a fixed price that is typically higher than the starting price of the auction.

Store application(s) 46 allows a seller to group listings within a "virtual" store, which may be branded and otherwise personalized by and for the seller. Such a virtual store may also offer promotions, incentives and features that are specific and personalized to a relevant seller.

Reputation applications 48 allow users that transact, utilizing the network-based marketplace 4, to establish, build and maintain reputations, which may be made available and published to potential trading partners. Consider that where, for example, the network-based marketplace 4 supports person-to-person trading, users may otherwise have no history or other reference information whereby the trustworthiness and credibility of potential trading partners may be assessed. The reputation applications 48 allow a user to establish a reputation within the network-based marketplace 4 over time, for example, through feedback provided by other transaction partners and by the computation of a feedback score based on the feedback. For example, the feedback score may be publicly displayed by the network-based marketplace 4. Other potential trading partners may then reference such a feedback score for the purposes of assessing credibility and trustworthiness.

Personalization applications 50 allow users of the network-based marketplace 4 to personalize various aspects of their interactions with the network-based marketplace 4. For example, a user may, utilizing an appropriate personalization application 50, create a personalized reference page at which information regarding transactions to which the user is (or has been) a party may be viewed. Further, a personalization application 50 may enable a user to personalize listings and other aspects of their interactions with the networked system 10 and other parties.

The networked system 10 may support a number of marketplaces that are customized, for example, for specific geographic regions. A version of the networked system 10 may be customized for the United Kingdom, whereas another version of the networked system 10 may be customized for the United States. Some of these versions may operate as an independent marketplace, or may be customized (or internationalized) presentations of a common underlying marketplace. The networked system 10 may accordingly include a number of internationalization applications 52 that customize information for (and/or the presentation of) information by) the networked system 10 according to predetermined criteria (e.g., geographic, demographic or marketplace criteria). For example, the internationalization applications 52 may be used to support the customization of information for a number of regional websites that are operated by the networked system 10 and that are accessible via the servers 24 and 26, both of FIG. 2.

Navigation of the network-based marketplace 4 may be facilitated by one or more navigation applications 54. For example, the navigation applications 54 may receive search information (e.g. a query) to search for items on the network-based marketplace and process the search information to generate search results. The navigation applications 54 may further include a browser application (not shown) to enable users to browse various category, catalogue, or inventory data structures according to which listings may be classified within the networked system 10. Various other navigation applications 54 may be provided to supplement the search and browsing applications.

In order to make the listings available via the networked system 10 as visually informing and attractive as possible, the marketplace and payment applications 30 and 32 may include one or more imaging applications 56 with which users may upload images (e.g., thumbnail images) for inclusion within listings. An imaging application 56 also operates to incorporate images (e.g., thumbnail images) within viewed listings. The imaging applications 56 may also support one or more promotional features, such as image galleries that are presented to potential buyers. For example, sellers may pay an additional fee to have an image included within a gallery of images for promoted items.

Listing creation applications 58 enable sellers to conveniently author listings pertaining to goods or services that they wish to transact via the network-based marketplace 4, and listing management applications 60 enable sellers to manage such listings. Specifically, where a particular seller has authored and/or published a large number of listings, the management of such listings may present a challenge. The listing management applications 60 provide a number of features (e.g., auto-relisting, inventory level monitors, etc.) to assist the seller in managing such listings. The listing creation applications 58 may further facilitate a buyer watching specific listings or specific types of listings.

One or more post-listing management applications 62 may also assist sellers with a number of activities that may typically occur post-listing. For example, upon completion of an auction facilitated by one or more of the auction applications 42, a seller may wish to leave feedback regarding a particular buyer. To this end, a post-listing management application 62 may provide an interface to one or more of the reputation applications 48, so as to allow the seller conveniently to provide feedback regarding multiple buyers to the reputation applications 48.

Dispute resolution applications 64 provide mechanisms whereby disputes arising between transacting parties may be resolved. For example, the dispute resolution applications 64 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 66 implement fraud detection and prevention mechanisms to reduce the occurrence of fraud within the network-based marketplace 4.

Messaging applications 68 are responsible for the generation and delivery of messages to users of the network-based marketplace 4, with such messages, for example, advising users regarding the status of listings at the network-based marketplace 4 (e.g., providing "outbid" notices to bidders during an auction process or providing promotional and merchandising information to users). The respective messaging applications 68 may utilize any one of a number of message delivery networks and platforms to deliver messages to users. For example, the messaging applications 68 may deliver electronic mail (e-mail), instant message (IM). Short Message Service (SMS), text, facsimile, or voice (e.g., Voice over IP (VoIP)) messages via the wired (e.g., Plain Old Telephone Service (POTS), or wireless (e.g., mobile, cellular, WiFi (e.g., IEEE 802.11 technologies including 802.11n, 802.11b, 802.11g, and 802.11a), or Worldwide Interoperability for Microwave Access (e.g., WiMAX-IEEE 802.16)) networks.

Merchandising applications 70 support various merchandising functions that are made available to sellers to enable sellers to increase sales via the network-based marketplace 4. The merchandising applications 70 also operate the various merchandising features that may be invoked by sellers and may monitor and track the success of merchandising strategies employed by sellers. In addition, the user may utilize transaction incentivizing applications 72 to select one or more criteria that may be used to generate a social goodness index that is used to generate a badge. Bid predicting applications 74 may facilitate the prediction of whether no more bids are expected to be received in an auction that is described by a listing 23.

Data Structures

Figure 4A:
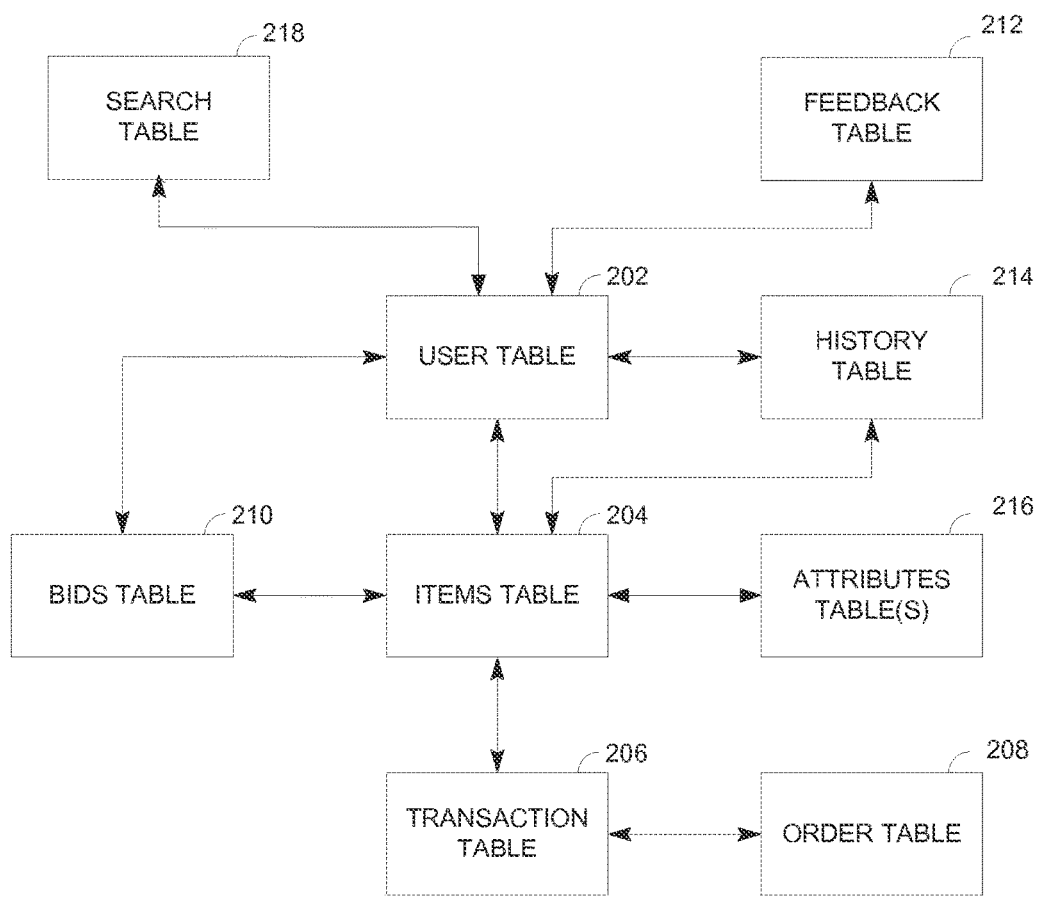
FIG. 4A is a block diagram illustrating tables, according to an embodiment.

FIG. 4A is a high-level entity-relationship diagram, illustrating various tables 200 that may be maintained within the databases 9 of FIG. 2, and that are utilized by and support the marketplace applications 30 and payment applications 32, both of FIG. 3. A user table 202 may contain a record for each of the registered users of the network-based marketplace 4 of FIG. 2. A user may operate as a seller, a buyer, or both, within the network-based marketplace 4. In one example embodiment, a buyer may be a user that has accumulated value (e.g., commercial or proprietary currency), and is accordingly able to exchange the accumulated value for items that are offered for sale by the network-based marketplace 4.

The tables 200 may also include an items table 204 in which item records (e.g., listings) are maintained for goods and services (e.g., items) that are available to be, or have been, transacted via the network-based marketplace 4. Item records (e.g., listings) within the items table 204 may furthermore be linked to one or more user records within the user table 202, so as to associate a seller and one or more actual or potential buyers with an item record (e.g., listing).

A transaction table 206 may contain a record for each transaction (e.g., a purchase or sale transaction or auction) pertaining to items for which records exist within the items table 204.

An order table 208 may be populated with order records, with each order record being associated with an order. Each order, in turn, may be associated with one or more transactions for which records exist within the transaction table 206.

Bid records within a bids table 210 may relate to a bid received at the network-based marketplace 4 in connection with an auction-format listing supported by an auction application 42 of FIG. 3. A feedback table 212 may be utilized by one or more reputation applications 48 of FIG. 3, in one example embodiment, to construct and maintain reputation information concerning users in the form of a feedback score. A history table 214 may maintain a history of transactions to which a user has been a party. One or more attributes tables 216 may record attribute information that pertains to items for which records exist within the items table 204. Considering only a single example of such an attribute, the attributes tables 216 may indicate a currency attribute associated with a particular item, with the currency attribute identifying the currency of a price for the relevant item as specified by a seller. A search table 218 may store search information that has been entered by a user (e.g., a buyer) who is looking for a specific type of listing.

FIG. 4B is a block diagram illustrating a bids table 210, according to an embodiment. The bids table 210 may include bid information 19 that is used to predict bidding behaviour.

FIG. 4C is a block diagram illustrating bid information 19, according to an embodiment. The bid information 19 may store bid classification information 300 for predicting bid behaviour that is organized according to a number of bids. For example, the bid classification information 300 for zero bids may be used to predict whether a listing 23 that has zero bids is expected to receive no more bids. Also, for example, the bid classification information 300 for one bid may be used to predict whether a listing 23 that has one bid is expected to receive no more bids, etc.

FIG. 4D is a block diagram illustrating bid classification information 300, according to an embodiment. The bid classification information 300 may include a number of bids 302 (e.g., zero, one, two, "N"), monitoring information 304, context granularity 306, and a success threshold 308. The number of bids 302 signifies the type of bid classification information 300. For example, the bid classification information 300 may be signified for zero, one, two, "N" bids. The monitoring information 304 may store bid classification information 300 for different contexts associated with the particular number of bids. Recall that a context characterizes a listing according to "N" dimensions where a dimension is a discrete unit of listing information (e.g., price, time remaining in auction, etc.). The context granularity information 306 may be used to define the start and stop boundaries of a dimension. For example, a context granularity 306 of ten percent may be used to segment a dimension into ten parts, and a context granularity 306 of twenty percent may be used to segment a dimension into five parts. If, for example, the listing information includes a price that may range from 1 to $100 (e.g., P(1-20), P(21-40), etc.) and a seller rating that may range from 1 to 100 (e.g., R(1-20), R(21-40), etc.) and both dimensions are associated with a context granularity 306 of twenty percent, then the price and seller rating dimensions may be divided into five parts each and plotted together to define twenty-five contexts as follows:

| R(81-100) | Context 20 | Context 21 | Context 22 | Context 23 | Context 24 |
|---|---|---|---|---|---|
| R(61-80) | Context 15 | Context 16 | Context 17 | Context 18 | Context 19 |
| R(41-60) | Context 10 | Context 11 | Context 12 | Context 13 | Context 14 |
| R(21-40) | Context 5 | Context 6 | Context 7 | Context 8 | Context 9 |
| R(1-20) | Context 0 | Context 1 | Context 2 | Context 3 | Context 4 |
| | P(1-20) | P(21-40) | P(41-60) | P(61-80) | P(81-100) |

Accordingly, the above two dimensions may be segmented with a context granularity 306 of twenty-percent to define twenty-five contexts. It follows that other schemes of contexts may be defined with "N" dimensions and with other context granularity 306. The context granularity 306 may be configured by a system administrator. A success threshold 308 may store a definition of success (e.g., seventy percent) for a particular context, as described further below. The success threshold 308 may be configured by a system administrator.

FIG. 4E is a block diagram illustrating monitoring information 304, according to an embodiment. The monitoring information 304 may include multiple pieces of context information 310 that are accessed according to listing information, as described above.

FIG. 4F is a block diagram illustrating context information 310, according to an embodiment. The context information 310 may include a context identifier 312, a number of trials 314, and a number of successes 316. The context identifier 312 may be used to identify the context information 310 (e.g., Context 0, Context 1, Context N, . . . ). The number of trials 314 may identify the number of listings 23 that were identified in the particular context. The number of successes 316 may identify the number of listings 23 that were identified in the particular context and further identified as not receiving another bid while in the particular context (e.g., the auction ended before another bid was received).

Figure 5A:
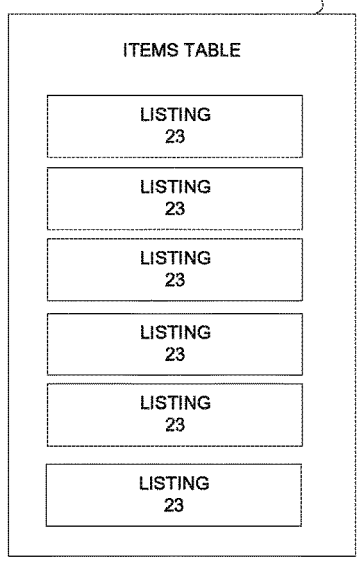
FIG. 5A is a block diagram illustrating an items table, according to an embodiment.

FIG. 5A is a block diagram illustrating an items table 21, according to an embodiment. The items table 21 may include multiple listings 23. Each listing 23 may describe an item or service that is being offered for sale or for auction on the network-based marketplace 4.

Figure 5B:
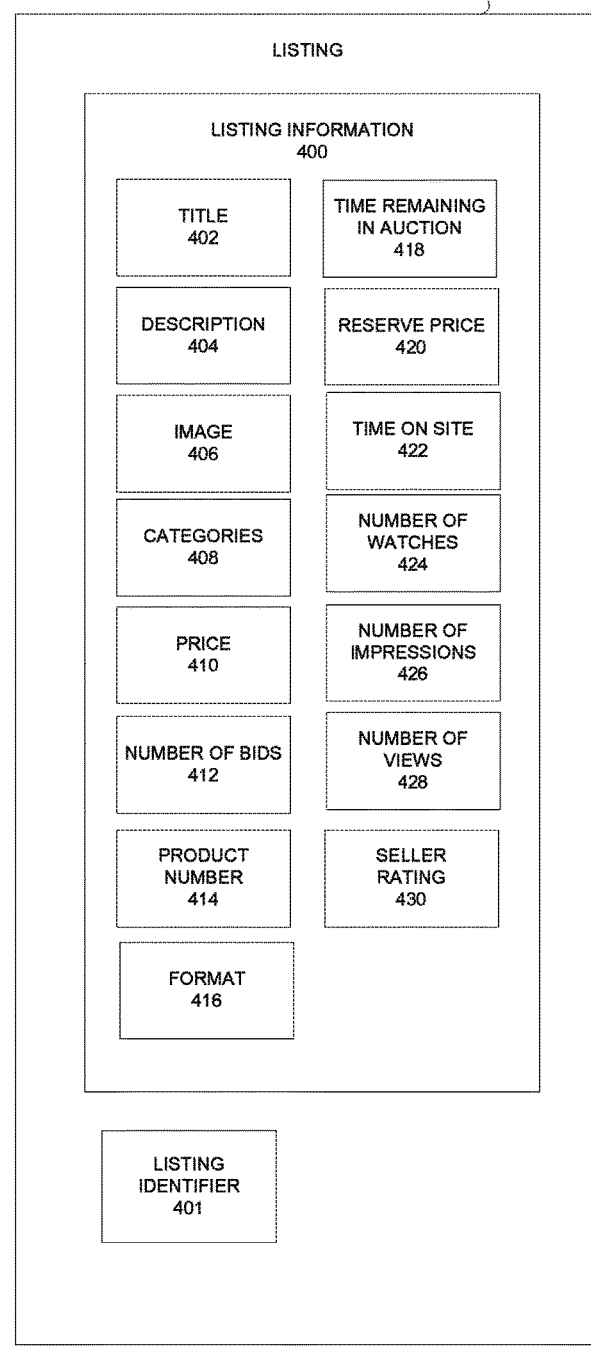
FIG. 5B is a block diagram illustrating a listing, according to an embodiment.

FIG. 5B is a block diagram illustrating a listing 23, according to an embodiment. The listing 23 may include listing information 400 and a listing identifier 401. The listing information 400 may be used to identify a context for the listing 23 within the appropriate bid classification information 300 (e.g., based on the number of bids). For example, each of the elements in the listing information 400 may be used as a dimension in identifying a context for the listing 23. The listing information 400 may include a title 402, a description 404, an image 406, one or more categorie(s) 408, a price 410, a number of bids 412, a product number 414, a format 416, a time remaining in auction 418, a reserve price 420, a time on site 422, a number of watches 424, a number of impressions 426, a number of views 428 and a seller rating 430. The title 402 and description 404 may include text that is entered by the seller. The image 406 may be uploaded by the seller. The one or more categorie(s) 408 may be assigned by the seller or the network-based marketplace 4 and are used to locate the listing 23 under a navigable hierarchy of categories. The price 410 may be the asking price of the item or service for immediate purchase or the highest bid. The number of bids 412 may include the current total number of bids that have been received by the network-based marketplace 4 for the item or service described by the listing 23. The product number 414 may include a global trade number (GTIN), a universal product code (UPC), a manufacture part number (MPN) or some other standard product identifier that identifies the item being described. The format 416 may indicate whether the item is being auctioned, available for immediate purchase, or both (e.g., available for immediate purchase and auction until some criterion is satisfied (e.g., eBay Buy It Now)). The time remaining in auction 418 is the time remaining until the auction finishes. For example, an auction may progress for five business days. The reserve price 420 is the minimum bid to win the auction as configured by the seller of the item described by the listing 23. For example, the listing may close without a winner in response to the reserve price 420 not being satisfied with the maximum bid. The time on site 422 is the time the item has been listed on the network-based marketplace 4 (e.g., if the same item has been listed in multiple auctions). The number of watches 424 is the number of placements of the listing 23 on watch lists (e.g., lists that enable users to view the item's current price and receive an email in response to status changes of the listing 23). The number of impressions 426 is the number of times the listing 23 was displayed to users. The number views 428 is the number of times the listing 23 was selected for viewing by a user (e.g., from the search results). The seller rating 430 may include a numerical rating of the seller (e.g., 0-100, with 100 being a maximum rating). For example, the seller rating 430 may be determined by buyer feedback or some other type of feedback.

Figure 6A:
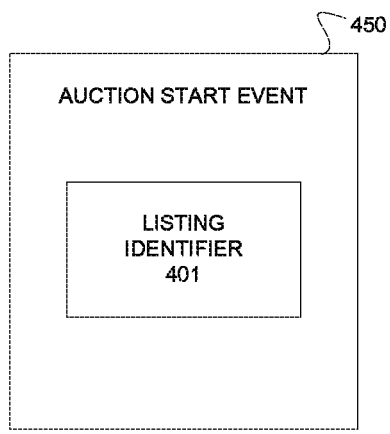
FIG. 6A is a block diagram illustrating an auction start event, according to an embodiment.

FIG. 6A is a block diagram illustrating an auction start event 450, according to an embodiment. The auction start event 450 may be an event that is communicated by a bid predicting application 74 in response to the bid predicting application 74 detecting a beginning of an auction for a listing 23. The auction start event 450 may be received by the monitoring module 15 and processed by the generating module 17 to generate/update bid information 19. The auction start event 450 may include a listing identifier 401 that identifies a listing 23 for which the auction is starting.

Figure 6B:
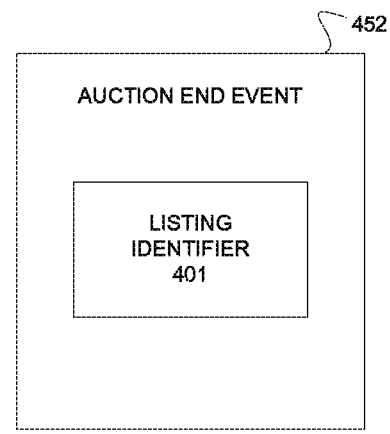
FIG. 6B is a block diagram illustrating an auction end event, according to an embodiment.

FIG. 6B is a block diagram illustrating an auction end event 452, according to an embodiment. The auction end event 452 may be an event that is communicated by a bid predicting application 74 in response to the bid predicting application 74 detecting an end of an auction for a listing 23. The auction end event 452 may be received by the monitoring module 15 and processing by the generating module 17 to generate/update bid information 19. The auction end event 452 may include a listing identifier 401 that identifies a listing 23 for which the auction is ending.

Figure 6C:
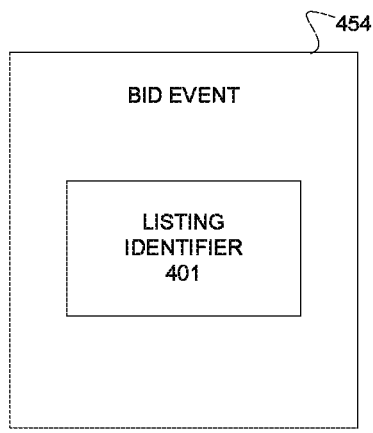
FIG. 6C is a block diagram illustrating a bid event, according to an embodiment.

FIG. 6C is a block diagram illustrating a bid event 454, according to an embodiment. The bid event 454 may be an event that is communicated by a bid predicting application 74 in response to bid predicting application 74 detecting the reception of a bid for an item or service that is described by a listing 23. The bid event 454 may be received by the monitoring module 15 and processed by the generating module 17 to generate/update bid information 19. The bid event 454 may include a listing identifier 401 that identifies a listing 23 for which the bid is being received.

Figure 7A:
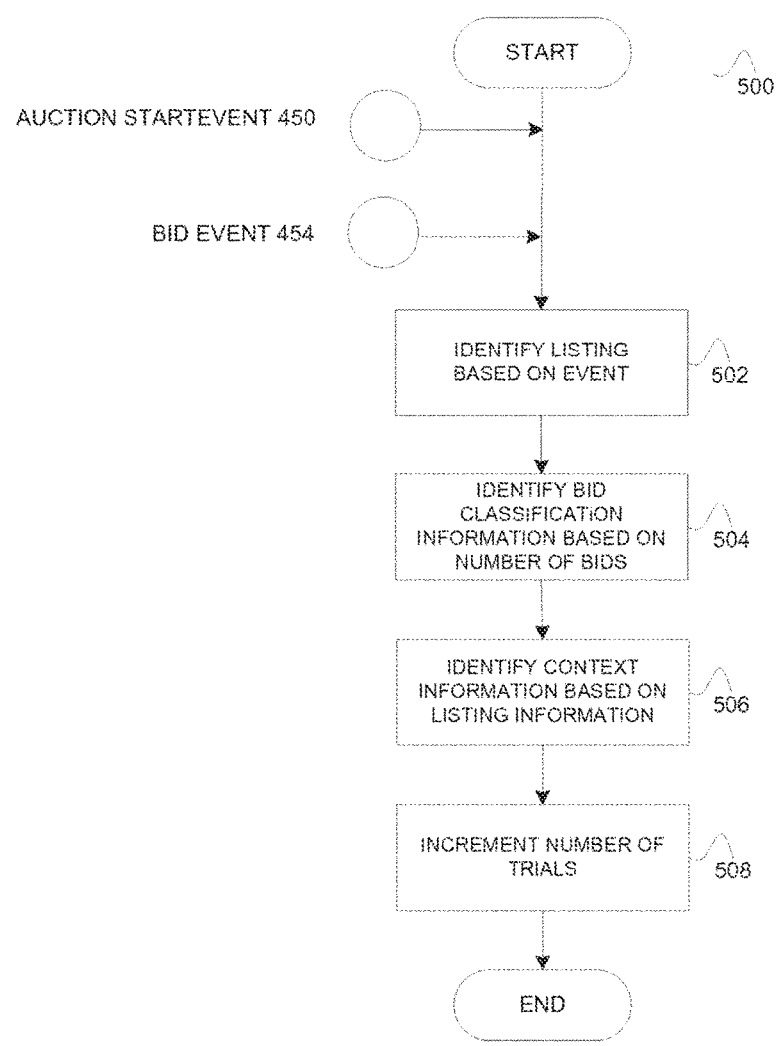
FIG. 7A is a flow diagram illustrating a method, according to an embodiment, to increment a number of trials.

FIG. 7A is a flow diagram illustrating a method 500, according to an embodiment, to increment a number of trials. The method 500 may commence with the monitoring module 15, at the network-based marketplace 4, receiving an auction start event 450 for a listing 23 or a bid event 454 for a listing 23. At operation 502, the monitoring module 15 may receive the auction start event 450 or the bid event 454 and identify the listing 23 based on a listing identifier 401 in the event 450 or 454. At operation 504, the generating module 17 may identify the appropriate bid classification information 300 based on the number of bids 412 in the listing 23 (e.g., zero bids). At operation 506, the generating module 17 may identify the appropriate context information 310 in the identified bid classification information 300 based on the listing information 400 in the listing 23. For example, each of the elements in the listing information 400 (e.g., categories 408, price 410, etc.) may be utilized as an input that is received by the generating module 17 (e.g., in aggregate, clusters, or alone) and processed by the generating module 17 to identify the appropriate context information 310. At operation 508, the generating module 17 may increment the number of trials 314 in the appropriate context information 310.

FIG. 7B is a flow diagram illustrating a method 540, according to an embodiment, to increment a number of successes. The method 540 may commence with the monitoring module 15, at the network-based marketplace 4, receiving an auction end event 452 for a listing.

At operation 544, the monitoring module 15 may receive the auction end event 452 and identify the listing 23 based on the listing identifier 401 in the auction end event 452. At operation 546, the generating module 17 may identify the appropriate bid classification information 300 based on the number of bids 412 in the listing 23 (e.g., zero bids). At operation 548, the generating module 17 may identify the appropriate context information 310 in the identified bid classification information 300 based on the listing information 400 in the listing 23. For example, each of the elements in the listing information 400 (e.g., categories 408, price 410, etc.) may be utilized as an input that is received by the generating module 17 (e.g., in aggregate, clusters, or alone) and processed by the generating module 17 to identify the appropriate context information 310. At operation 550, the generating module 17 may increment the number of successes 316 in the appropriate context information 310.

Figure 7C:
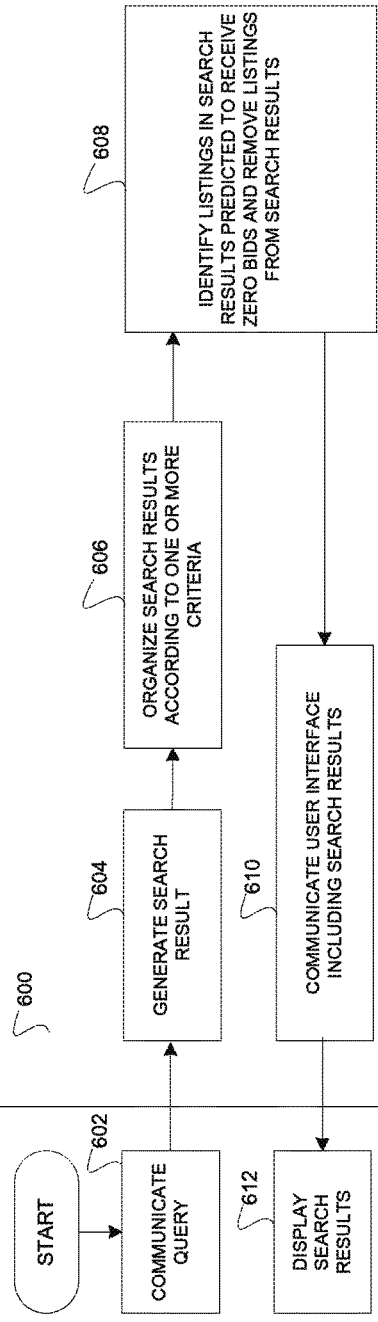
FIG. 7C is a flow diagram illustrating a method, according to an embodiment, to predict bidding behaviour of listings in search results.

FIG. 7C is a flow diagram illustrating a method 600, according to an embodiment, to predict bidding behaviour of listings 23 in search results. A client machine 8 is illustrated on the left and the network-based marketplace 4 is illustrated on the right. The method 600 may commence at operation 602 with the client machine 8 communicating a query over the network 6 to the network-based marketplace 4.

At operation 604, the network-based marketplace 4 may receive the query and generate search results including a set of links that respectively correspond to listings 23. At operation 606, the network-based marketplace 4 may organize the links in the search results according to one or more criteria. For example, network-based marketplace 4 may organize the links in the search results such that the listings with auctions that will end soonest are presented before those that will end later. At operation 608, the network-based marketplace 4 may identify listings 23 in the search results that are predicted to receive no more than zero bids and remove the identified listings 23, as described further below. At operation 610, the network-based marketplace 4 may communicate a user interface to the client machine 8 including the updated search results.

At operation 612, the client machine 8 may receive and display the search results.

Figure 7D:
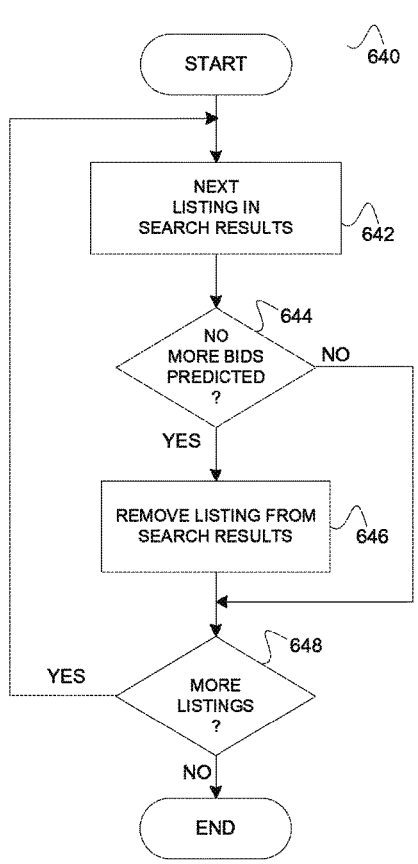
FIG. 7D is a flow diagram illustrating a method, according to an embodiment, to remove listings in search results based on bidding behaviour.

FIG. 7D is a flow diagram illustrating a method 640, according to an embodiment, to remove listings 23 from search results based on bidding behaviour. The method 640 in FIG. 7D corresponds to operation 608 in FIG. 7C. The method 640 may commence at operation 642 with the identifying module 11 identifying the next listing 23 (i.e., the link to the next listing 23) in the search results. At decision operation 644, the predicting module 13 may predict whether no more bids are predicted to be received for the item or service described by the listing 23. If no more bids are predicted for the listing then processing continues at operation 646. Otherwise processing continues at operation 648. At operation 646, the predicting module 13 may remove the listing 23 from the search results. At decision operation 648, the predicting module 13 may identify whether the search results include more listings 23. If the search results include more listings 23 then processing continues at operation 642. Otherwise, processing continues at operation 610 in FIG. 7C.

Figure 7E:
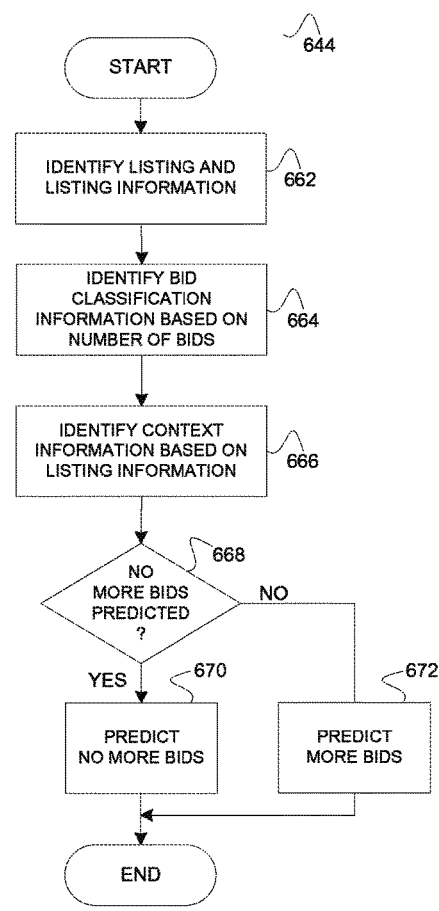
FIG. 7E is a flow diagram illustrating a method, according to an embodiment, to predict bidding behaviour.

FIG. 7E is a flow diagram illustrating a method 644, according to an embodiment, to predict bidding behaviour. The method 644 in FIG. 7E corresponds to decision operation 644 in FIG. 7D. The method 644 may commence at operation 662 with the identifying module 11 may utilize the link to the listing to identify the listing 230 and the listing information 400 in the listing 230. At operation 664, the identifying module 11 may identify the appropriate bid classification information 300 based on the number of bids 412 in the listing 23 (e.g., zero bids). At operation 666, the identifying module 11 may identify the appropriate context information 310 in the identified bid classification information 300 based on the listing information 400 in the listing 23. For example, each element in the listing information 400 (e.g., categories 408, price 410, etc.) may be utilized as an input that is received by the identifying module 11 (e.g., in aggregate, clusters, or alone) and processed by the identifying module 11 to identify the appropriate context information 310. At decision operation 668, the predicting module 13 may divide the number of successes 316 in the appropriate context information 310 by the number of trials 314 in the same context information 310 to yield a result. If the predicting module 13 identifies the result as being greater than or equal to the success threshold 308, then the predicting module 13 identifies a success (e.g., predicts no more bids) and branches to operation 670. Otherwise, the predicting module 13 branches to operation 672 (e.g., predicts more bids).

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a stand-alone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. In embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses) that connects the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, or software, or in combinations of these. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture

Figure 8:
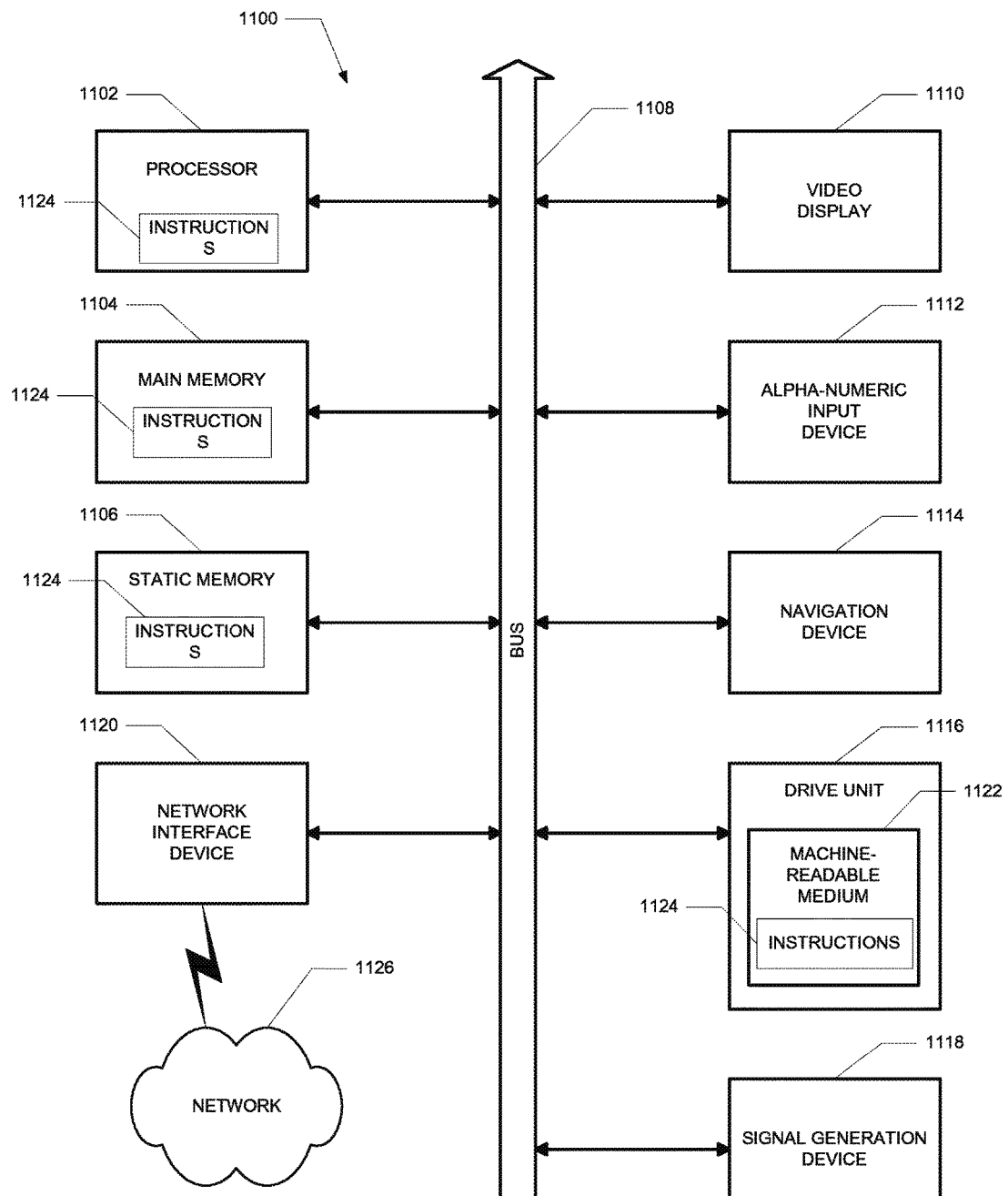
FIG. 8 shows a diagrammatic representation of a machine in the example form of a computer system, according to an example embodiment.

FIG. 8 is a block diagram of a machine within which instructions may be executed for causing the machine to perform any one or more of the methodologies discussed herein. The machine (e.g., computer system) may be embodied as the mobile device 5 and the network-based marketplace 4. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any other machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU) or both), a main memory 1104 and a static memory 1106, which communicate with each other via a bus 1108. The computer system 1100 may further include a video display 1110 (e.g., a liquid crystal display (LCD) or a cathode ray tube (CRT)). The computer system 1100 also includes an alphanumeric input device 1112 (e.g., a keyboard), a user interface (UI) navigation device 1114 (e.g., cursor control) (e.g., a mouse), a drive unit 1116, a signal generation device 1118 (e.g., a speaker) and a network interface device 1120.

Machine-Readable Medium

The drive unit 1116 includes a machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104 and/or within the processor 1102 during execution thereof by the computer system 1100, the main memory 1104 and the processor 1102 also constituting machine-readable media. Instructions 1124 may also reside within the static memory 1106.

While the machine-readable medium 1122 is shown in an example embodiment to be a single medium, the term "machine-readable medium" may include a single medium or multiple media (e.g., a centralized or distributed database, and/or associated caches and servers) that store the one or more instructions 1124 or data structures. The term "machine-readable medium" shall also be taken to include any tangible medium that is capable of storing, encoding or carrying instructions for execution by the machine and that cause the machine to perform any one or more of the methodologies of the present inventive subject matter, or that is capable of storing, encoding or carrying data structures utilized by or associated with such instructions. The term "machine-readable medium" shall accordingly be taken to include, but not be limited to, solid-state memories and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1124 may further be transmitted or received over a communications network 1126 using a transmission medium. The instructions 1124 may be transmitted using the network interface device 1120 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of ordinary skill in the art upon reviewing the above description. Other embodiments may be utilized and derived therefrom, such that structural and logical substitutions and changes may be made without departing from the scope of this disclosure. The figures provided herein are merely representational and may not be drawn to scale. Certain proportions thereof may be exaggerated, while others may be minimized. Accordingly, the specification and drawings are to be regarded in an illustrative rather than a restrictive sense.

Thus, systems and methods to predict bidding behaviour were disclosed. While the present disclosure has been described in terms of several example embodiments, those of ordinary skill in the art will recognize that the present disclosure is not limited to the embodiments described, but may be practiced with modification and alteration within the spirit and scope of the appended claims. The description herein is thus to be regarded as illustrative instead of limiting.

We claim:

1. A system to prevent display of a listing not likely to receive a bid, the system comprising:
at least one processor and executable instructions accessible on a computer-readable medium that, when executed, cause the at least one processor to perform operations comprising:
receiving an event, over a network and after a beginning of an auction with time remaining in the auction, from a first client machine being operated by a first person, the event including a bid for an item being auctioned on a network-based marketplace supporting person-to-person trading, the item being described by a listing including listing information including a number of bids counter storing a number of bids received for the item;
identifying a first context from a plurality of contexts, the identifying being based on a number of bids registered in the number of bids counter of the listing and at least one discrete unit of the listing information of the listing, the first context including a first trial counter registering a number of listings identified in the first context;
incrementing the first trial counter in the first context to register the listing as identified in the first context and incrementing the number of bids counter in the listing to register receipt of the bid for the item described by the listing, the incrementing the first trial counter and the incrementing the number of bids counter being responsive to receiving the event including the bid;
receiving the query, over the network and before an ending to the time remaining in the auction, from a second client machine being operated by a second person;
generating search results based on the query, the search results including at least two listings that are positioned in a specific order in the search results, the at least two listings respectively describing an item being auction on the network-based marketplace, the at least two listings including the listing describing the item;
predicting bidding behavior for each of the at least two items with a bidding predictor machine, the predicting of the bidding predictor machine for the listing comprising:
identifying the listing as being in a second context based on a number of bids registered in the number of bids counter in the listing and on the at least one discrete unit of the listing information, the second context including a second trial counter registering a number of listings identified in the second context and a success counter registering a number of listings identified in the second context and not receiving another bid in the second context,
predicting no more bids will be received for the item based on the number of bids counter in the listing, the second trial counter and the success counter;
removing the listing from the search results based on the predicting; and
communicating a user interface over a network to the second client machine, the user interface including at least a portion of the search results without the listing to prevent display of the listing on the second client machine.

2. The system of claim 1, wherein the listing information includes a number of watches performed on the item.

3. The system of claim 1, wherein the listing information includes a time remaining in an auction.

4. The system of claim 1, wherein the operations are further comprising identifying the listing in search results that include a plurality of listings that include the listing and wherein the number of bids received for the item is one and wherein a bid classification information is identified based on one bid.

5. The system of claim 1, wherein the operations are further comprising identifying the listing in search results include a plurality of listings that include the listing and wherein the number of bids received for the item is zero and wherein a bid classification information is identified based on zero bids.

6. The system of claim 1, wherein the operations are further comprising repositioning the listing in a set of search results.

7. A method to prevent display of a listing not likely to receive a bid, the method comprising:
receiving an event, over the network and after a beginning of an auction with time remaining in the auction, from a first client machine being operated by a first person, the event including a bid for an item being auctioned on a network-based marketplace supporting person-to-person trading, the item being described by a listing including listing information including a number of bids counter storing a number of bids received for the item;
identifying a first context from a plurality of contexts, the identifying being based on a number of bids registered in the number of bids counter of the listing and at least one discrete unit of the listing information of the listing, the first context including a trial counter registering a number of listings identified in the first context;
incrementing the trial counter in the first context to register the listing as identified in the first context and incrementing the number of bids counter in the listing to register receipt of the bid for the item described by the listing, the incrementing the first trial counter and the incrementing the number of bids counter being responsive to receiving the event including the bid;
receiving the query, over the network and before an ending to the time remaining in the auction, from a second client machine being operated by a second person;
generating search results based on the query, the search results including at least two listings that are positioned in a specific order in the search results, the at least two listings respectively describing an item being auction on the network-based marketplace, the at least two listings including the listing;
predicting bidding behavior for each of the at least two items with a bidding predictor machine, the predicting of the bidding predictor machine for the listing comprising:
identifying the listing as being in a second context based on a number of bids registered in the number of bids counter in the listing and on the at least one discrete unit of the listing information, the second context including a second trial counter registering a number of listings identified in the second context and a success counter registering a number of listings identified in the second context and not receiving another bid in the second context,
predicting no more bids will be received for the item based on the number of bids counter in the listing, the second trial counter and the success counter;
removing the listing from the search results based on the predicting; and
communicating a user interface over a network to the second client machine, the user interface including at least a portion of the search results without the listing to prevent display of the listing on the second client machine.

8. The method of claim 7, wherein the listing information includes a number of watches performed on the item.

9. The method of claim 7, wherein the listing information includes a time remaining in an auction.

10. The method of claim 7, wherein the listing is included in search results include a plurality of listings that include the listing and wherein the number of bids received for the item is one and wherein a bid classification information is being identified based on one bid.

11. The method of claim 7, wherein the listing is included in search results include a plurality of listings that include the listing and wherein the number of bids received for the item is zero and wherein a bid classification information is being identified based on zero bids.

12. The method of claim 11, further comprising:
repositioning the listing in a set of search results.

13. A machine-readable medium having no transitory signals and storing instructions that, when executed by at least one processor, cause the at least one processor to perform actions comprising:

receiving an event, over the network and after a beginning of an auction with time remaining in the auction, from a first client machine being operated by a first person, the event including a bid for an item being auctioned on a network-based marketplace supporting person-to-person trading, the item being described by a listing including listing information including a number of bids counter storing a number of bids received for the item;
identifying a first context from a plurality of contexts, the identifying being based on a number of bids registered in the number of bids counter of the listing and at least one discrete unit of the listing information of the listing, the first context including a first trial counter registering a number of listings identified in the first context;
incrementing the first trial counter in the first context to register the listing as identified in the first context and incrementing the number of bids counter in the listing to register receipt of the bid for the item described by the listing, the incrementing the first trial counter and the incrementing the number of bids counter being responsive to receiving the event including the bid;
receiving the query, over the network and before an ending to the time remaining in the auction, from a second client machine being operated by a second person;
generating search results based on the query, the search results including at least two listings that are positioned in a specific order in the search results, the at least two listings respectively describing an item being auction on the network-based marketplace, the at least two listings including the listing describing the item;
predicting bidding behavior for each of the at least two items with a bidding predictor machine, the predicting of the bidding predictor machine for the listing comprising:
identifying the listing as being in a second context based on a number of bids registered in the number of bids counter in the listing and on the at least one discrete unit of the listing information, the second context including a second trial counter registering a number of listings identified in the second context and a success counter registering a number of listings identified in the second context and not receiving another bid in the second context,
predicting no more bids will be received for the item based on the number of bids counter in the listing, the second trial counter and the success counter;
removing the listing from the search results based on the predicting; and
communicating a user interface over a network to the second client machine, the user interface including at least a portion of the search results without the listing to prevent display of the listing on the second client machine.

* * * * *